United States Patent [19]

Chrisman

[11] 4,245,132

[45] Jan. 13, 1981

[54] ELECTRIC MELT FURNACE-ELECTRODES INCLINED TOWARD EACH OTHER TO VARY THE FIRING PATH DURING STEADY STATE OPERATION AND TO CREATE HOT SPOTS AFTER HEAT LOSS OR DURING START-UP

[75] Inventor: Max G. Chrisman, Granville, Ohio

[73] Assignee: Owens-Corning Fiberglas Corporation, Toledo, Ohio

[21] Appl. No.: 956,551

[22] Filed: Oct. 30, 1978

[51] Int. Cl.[3] .......................... C03B 5/02; H05B 3/00

[52] U.S. Cl. .......................... 13/6; 13/23

[58] Field of Search .......................... 13/6, 23, 24

[56] References Cited

U.S. PATENT DOCUMENTS

| | | | |
|---|---|---|---|
| 2,267,537 | 12/1941 | Romazzotti | 13/6 |
| 2,277,678 | 3/1942 | Borel | 13/6 |
| 2,749,378 | 6/1956 | Penberthy | 13/6 |
| 2,921,106 | 1/1960 | Arbeit | 13/6 X |
| 2,993,079 | 10/1961 | Augsburger | 13/6 |
| 3,145,246 | 8/1964 | Augsburger | 13/6 |
| 3,742,111 | 6/1973 | Pieper | 13/6 |
| 3,842,180 | 10/1974 | Froberg | 13/6 |

*Primary Examiner*—Roy N. Envall, Jr.

*Attorney, Agent, or Firm*—Ronald C. Hudgens; Charles F. Schroeder; Joel I. Rosenblatt

[57] ABSTRACT

Where electrodes mounted in an electric melt furnace are inclined toward each other, the current distribution between the electrodes is the least in density in the region between the electrodes where the displacement is the widest, and increases in the region between the electrodes at the tips where the displacement is the narrowest. The maximum current density can be focused in a particular area, preferably toward the upper regions of the electric melt furnace where the batch is being melted to its liquid state. Additionally, the high density current is removed from the walls, and wear and tear on the refractory is thereby reduced. An alternate embodiment is to group a number of inclined electrodes and to excite each of the separate electrodes within the group from a separate phase of the power supply. This produces current paths between each of the inclined electrodes in the group, and is used after the furnace is cooled down and hot spots must be created to start the furnace up again. In this way, even though the melted material has cooled and where the melting material has a negative resistance coefficient, the resistance has increased, the distance between the inclined electrodes is still small enough to effect a resistance path therebetween and create a current to heat up the material again. Once the operating temperature of the furnace has been regained, the electrodes may be switched so that all the inclined electrodes within the group are energized in parallel from the same phase of the power supply, and operated with another remote group of electrodes also connected in parallel to the same energy source.

9 Claims, 5 Drawing Figures

ELECTRIC MELT FURNACE-ELECTRODES INCLINED TOWARD EACH OTHER TO VARY THE FIRING PATH DURING STEADY STATE OPERATION AND TO CREATE HOT SPOTS AFTER HEAT LOSS OR DURING START-UP

BACKGROUND OF THE INVENTION

This application has a specification in common with application Ser. No. 956,475 filed Oct. 30, 1978 and assigned to the common assignee.

Electric melt furnaces are well known in the art, as are apparatus and methods for starting an electric glass melting furnace.

A known system is shown in U.S. Pat. No. 3,842,180. In that patent, parallel electrodes are shown entering the bottom wall of the furnace. The electrodes are arranged in groups, preferably groups of three. During start-up, when the material is cooled and the resistance is high, as in the case of glass having a negative resistance coefficient, hot spots must be created and a high source of energy applied to the melt. In this case, as shown in the prior art patent, each of the three electrodes within a single group is operated from a different phase of a polyphase power supply. The current then passes between each of the electrodes of a single group. Since the electrodes are close together, the resistive path between the electrodes permits the flow of current, even though the material to be melted is cool and its resistance high.

After a time, when the material has started to warm up and has reached operating temperature, each of the electrodes within a group is switched to operate off the same power supply in parallel, and a current path is created between that group of electrodes and a similar group of three electrodes which are also connected in parallel to the power supply. As in the first group of electrodes, the second group of electrodes is operated during the cool period of the furnace, with each of the electrodes within the second group connected to a separate phase of the power supply.

The electrodes shown within the prior art are typically parallel, generally entering the bottom of the furnace or the side of the furnace, and with a constant displacement maintained between the parallel electrodes.

The disadvantage of such prior art arrangement is that leakage occured between the electrodes all along the length of the electrodes, and the parallel electrodes were unable to maximize the energy at the tips of the electrodes or to direct the maximum energy to a particular area of the furnace. Overall, this increased wear and tear on the walls, as excessive energy flowed around the electrodes, about the walls, and directed excessive heat in portions of the furnace where the material was already melted and heated to a hot state, and where the additional heat was unnecessary.

The prior art shows electric furnaces for melting glass wherein the electrodes are convergent with respect to each other. One such example is shown in U.S. Pat. No. 2,267,537 issued Dec. 23, 1941. In that patent, convergent electrodes are shown mounted in the side wall of the furnace for placing the greatest amount of heat along the center line of the furnace. In addition, divergent electrodes are used for placing the maximum amount of heat along the sidewalls of the furnace to counteract the heat losses along the sidewalls. Other examples of the prior art show various modifications of electrodes inserted into a furnace at various angles with respect to each other. These prior art patents include: U.S. Pat. No. 3.374,211 wherein the electrodes are placed divergently; U.S. Pat. Nos. 3,145,246 and 3,147,328 where the electrodes enter the walls of the circular furnace and are spaced farther apart than at the tips; and U.S. Pat. No. 3,725,558.

However, it is believed that the prior art does not show two sets of electrodes: a group of inclined electrodes and a separate set of parallel electrodes. Further, the function of these electrodes and the interaction between these two groups is not known: that is, a group of inclined electrodes connected to create a current path with a parallel electrode and wherein a switching means is provided for selectively energizing the inclined electrodes operated as a group separately energizing the inclined electrodes and a parallel electrode to create a current path between the inclined electrode group and parallel electrode.

SUMMARY OF THE INVENTION

This invention provides an electric melt furnace for a heat-softenable material such as glass, and particularly the electrodes in the furnace converge toward each other by being inclined with respect to the wall through which the electrodes enter the furnace. Additionally, electrodes are arranged within groups with each of the electrodes inclined toward each other, so that during a cool period when the heat-softenable material is cooled and its resistance increases as in the case of glass, the inclined electrodes will have a diminished resistance therebetween to permit sufficient current to flow to create a hot spot or region. Once again, current will flow to warm the furnace and bring it to its proper operating temperature and resistance. Further, the electrodes within the group can be separately connected to different phases of power supply to cause current to flow between the electrodes of a single group. These grouped electrodes inclined toward each other are also generally inclined toward other groups of electrodes so that when the furnace has reached its proper operating temperature, the electrodes of each group may be operated in parallel with the current paths between separate groups of electrodes. Alternatively, the electrodes of a group of parallel connected inclined electrodes may be connected across a power supply to a non-inclined electrode.

DESCRIPTION OF THE PREFERRED EMBODIMENT

The principles of the invention are described with reference to the preferred embodiment and with reference to the drawings. In all cases of the drawings, similar numbers are used to indicate the same or similarly functioning parts.

Figure 1:
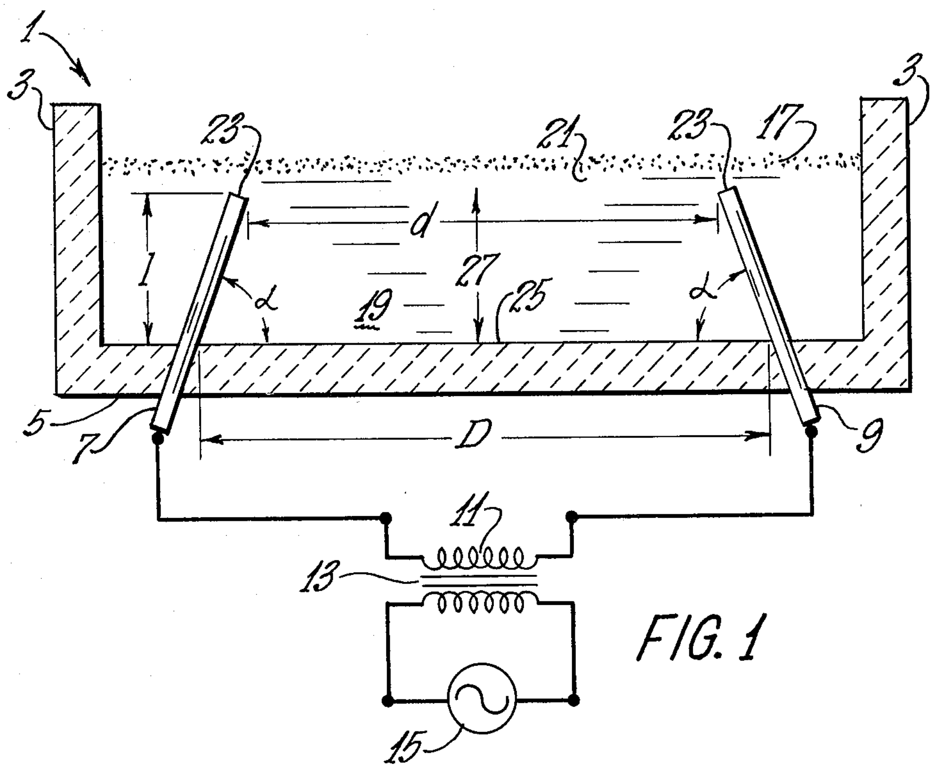
FIG. 1 shows an electric melt furnace in cross section, with the electrodes inserted through the floor or the bottom and inclined toward each other.

In FIG. 1, an electric melt furnace is shown generally by numeral 1. It presents a cross-sectional view having furnace sidewalls 3 and furnace bottom wall or floor 5. Electrodes 7 and 9 are shown entering the furnace through the bottom wall and are connected to the secondary 11 of a transformer 13 excited by a power supply 15.

As is well known in the art, the electrodes 7 and 9 may be connected between a single phase supply or across a polyphase supply.

The furnace has an unmelted batch portion shown by numeral 17, a melted portion shown by numeral 19, and an interface transition portion existing generally above the level of the electrode tips 23 where the heat-softenable material is transformed from its solid to its liquid state.

The electrodes enter through the bottom or floor 5 at an angle Alpha. As shown, the distance from the tip to the inside surface of the bottom wall 25 is shown as "1".

The distance of displacement between the electrodes at the inside bottom wall 25 is shown by "D" and the displacement between the electrodes at the tips is shown by "d".

In an example where the distance 1 is 3 feet, and the angle Alpha is approximately 18°, the displacement d would be approximately 2 feet less than the displacement D.

Where the entering angle Alpha is approximately 9°, the distance d would be approximately 1 foot less than the distance D.

As can be seen by inspection, the effect of d to D may be increased by increasing the distance D so that the ratio d to D is reduced, and the effect can be similarly decreased by decreasing the distance D so that the ratio d to D is increased. By way of explanation, as D is increased, the shortened distance d becomes shorter relative to the distance D, and the effect is thereby increased.

On the other hand, the effect is reduced where the distance D is reduced so that the distance d represents a longer distance relative to D.

As well known, current flowing between two electrodes has a current density. In this device, the current density has a gradient increasing from the point along the inside bottom wall 25 to the level between the electrodes 21, and along the gradient line 27.

The electrical energy along the bottom wall is thereby reduced compared to the energy flowing through the electrode tips 23 and refractory wear is reduced. Additionally, the electrical energy is concentrated substantially at its area of maximum current density along the level 21 between the tips, and moves the maximum heating effect away from the walls and directly under the batch 17 where it transforms the solid batch material into the liquid glass within the furnace.

Figure 2:
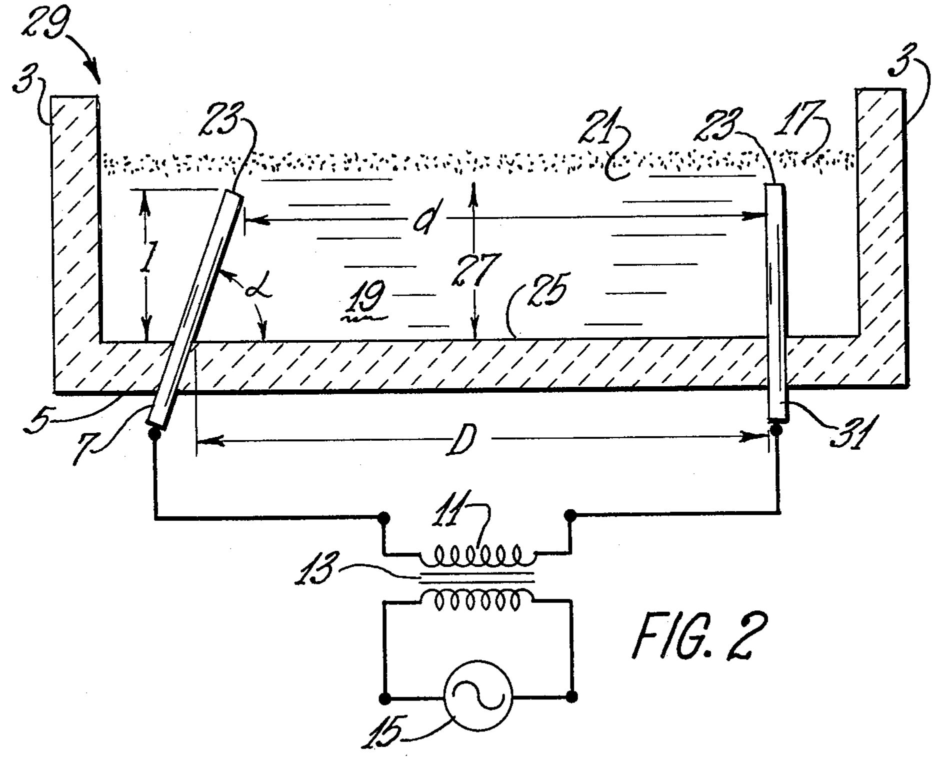
FIG. 2 shows the electric melt furnace of FIG. 1 in cross section, but with one of the electrodes entering through the floor or bottom and arranged perpendicular to the bottom in the manner of the prior art, and with the other electrode being inclined.

Referring now to FIG. 2, where the same numerals are used to show the same or similar parts, the furnace is shown generally by numeral 29. The furnace employs a combination of inclined electrode 7 and a straight electrode 31 perpendicular to the bottom furnace wall 25, as known in the prior art.

As in the case of FIG. 1, the current density is a maximum between the electrode tips 23 at level 21, diminishing along the gradient 27 toward the inner surface 25 of the bottom 5. However, the effect here is not as significant as where the electrodes are inclined toward each other, as shown in FIG. 1, but merely is provided to show an example of various modifications achieving different effects. As in the case of FIG. 1, the electrodes 7 and 31 are connected to supply 15 through transformer 13 having secondary 11.

FIG. 3 shows a further alternative, with the same parts operating in substantially the same manner indicated by the same numerals. The furnace is indicated generally by numeral 33, and the electrodes are shown entering through the bottom 5 in two groups — electrode group 35 having electrodes ***35a*, *35b* and *35c*, and electrode group 37 having electrodes *37a*, *37b* and *37c***.

Figure 3A:
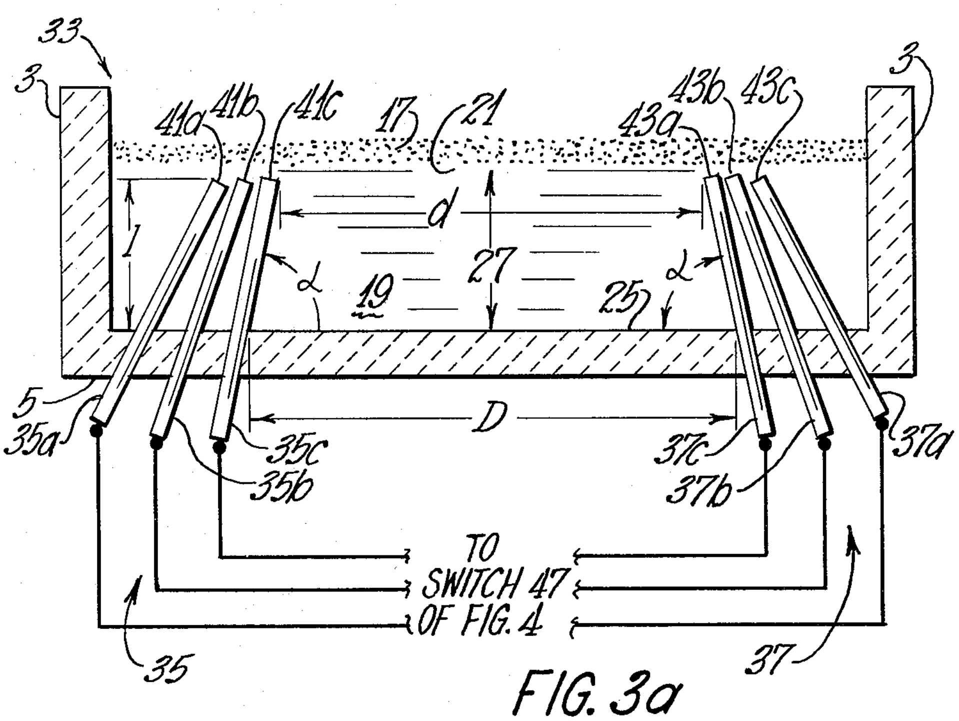
FIG. 3*a* shows the furnace of FIGS. 1 and 2 in cross section, with the inclined electrodes arranged in groups with the electric paths arranged either between each of the electrodes within a group, or between the separate groups and with the electrodes of each group connected in parallel.

As shown in FIG. 3A, the electrode group 35 contains three electrodes, as does the electrode group 37. The electrode group 37 is viewed as a group, with the distance d between the electrode tips ***41a*, *41b* and *41c* and tips *43a*, *43b* and *43c* of the opposite group, being an average distance and the distance D between the electrodes of each group being an average distance. The connection to the power supply is shown in FIG. 4**.

The electrodes of groups 35 and 37 may each be inclined at an angle of 5 to 20 degrees inclusive.

Figure 3B:
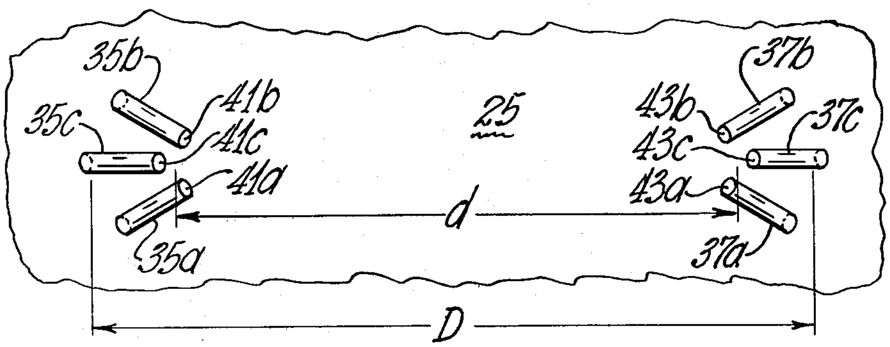
FIG. 3*b* shows the electrodes of FIG. 3*a* in a top view.

Referring now to FIG. 3B, a top view of the electrodes ***35a*, *35b* and *35c*, and *37a*, *37b* and *37c*, is shown, and particularly the arrangements of the tips *41a*, *41b* and *41c*, and *43a*, *43b* and *43c*. As shown in FIG. 3B, the average distance between the tips d is smaller or less than the average distance D between the electrodes where the electrodes enter through the bottom, and the relationship of the distance d to the distance D may still be maintained, as shown in FIGS. 1 and 2**.

Figure 4:
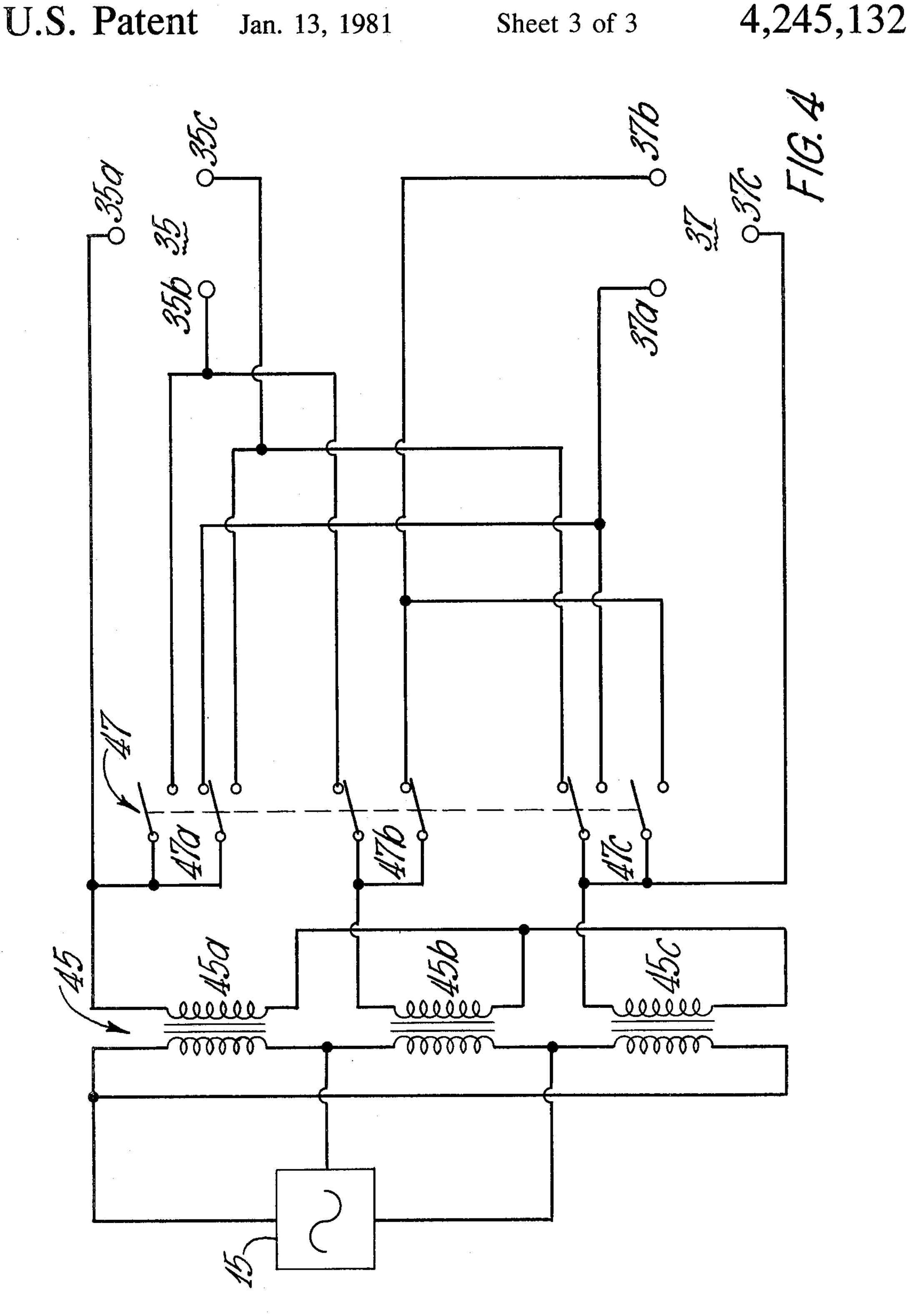
FIG. 4 shows a switching arrangement for the electrode groups shown in FIG. 3 to operate the separate groups in parallel during steady state and to connect each of the electrodes within the group to a separate phase of the power supply to induce current paths between the electrodes of each group during the start-up period or after the furnace has cooled down.

The manner of connecting the groups of electrodes is shown in FIGS. 3A and 3B, and is now shown with reference to FIG. 4.

As shown in FIG. 4, a power supply 15 supplies electrodes through a three-phase transformer 45 having single phase outputs at ***45a*, *45b* and *45c***.

A gang switch 47 having sections a, b and c, connects the electrodes of group 35 and the electrodes of group 37 in parallel, or the electrodes within each group to separate phases of the power supply 15, as will be explained.

FIG. 4 shows the gang switch 47 arranged during start-up or during the period when the furnace is cooled down, with the electrodes of each group connected through switch *47b*, and electrode *35c* is connected to transformer *45c* through switch *47c*.

Similarly, the electrodes *37a* of electrode group 37 is connected through to transformer *45a* through switch *47a*, electrode *37b* is connected to transformer *45b* through switch *47b*, and electrode *37c* is connected directly to the transformer *45c*.

In operation, during start-up or when the melted material has cooled, the resistance between the electrodes ***35a*, *35b* and *35c* of group 35, and the electrodes *37a*, *37b* and *37c* of group 37**, is diminished. In order to establish a current path between these electrodes, it is necessary to either have an increased voltage source, or to operate the electrodes over a shorter physical separation and shorter resistance.

This is accomplished by the connection as shown in FIG. 4, wherein current paths are established between the electrodes 35*a*, 35*b* and 35*c* of group 35 by connecting each of the electrodes to a separate phase of the power supply 15.

Similarly, current paths are established between electrodes 37*a*, 37*b* and 37*c* by connecting each of these electrodes to a separate phase of the power supply 15.

As shown in FIG. 3B, the electrodes of each group converge toward each other so that the distance between the electrodes at their tips 41*a*, 41*b* and 41*c* is considerably less than the distance between the electrodes at their bases, where the electrodes enter through the bottom wall 25. In this way, the highest current density is between the electrodes at their tips 41*a*, 41*b* and 41*c*, and the greatest heat is provided in this area, creating a hot spot away from the walls and close to the batch material. The same effect occurs for electrode tips 43*a*, 43*b* and 43*c* of electrode group 37.

After the time the furnace has come to the proper operating temperature and the resistance of the melted material is at the proper operating point, the more desirable, longer current path can be obtained by merely switching the switch 47 in the direction shown by the arrow 49 connecting electrodes 37*a*, 37*b* and 37*c* in parallel to the output of transformer 45*a*, and the electrodes 37*a*, 37*b* and 37*c* in parallel to the output of transformer 45*c*. The current path in this case will be that shown by the distance d of FIG. 3A with the effect as described relative to the inclined electrodes shown in FIG. 1. In particular, the current density will be higher along the distance d than it will be along the distance D, creating and directing the maximum heat at the level substantially shown by numeral 21 where the batch is transformed into its liquid state.

I claim:

1. An electric furnace for resistive heating of molten glass by the Joule effect comprising: a chamber for containing a body of said glass; a first and second electrode, each of said electrodes having a first end which is the base thereof and a second end which is opposite said first end; means for mounting said first and second electrodes in a spaced relationship in said chamber such that at least one of said electrodes is inclined toward the other electrode so that the distance between said first ends of said electrodes defines a longer electrical current path than the electrical current path defined by the distance between said second ends; and means for applying electrical power to said glass through said first and second electrodes for heating said glass by the Joule effect.

2. An electric furnace as recited in claim 1, further comprising: a third electrode, said electrode having a first end which is the base thereof and a second end which is opposite said first end; and means for mounting said third electrode in a spaced relationship in said chamber such that said base of said first electrode is spaced farther from said base of said second electrode than it is from said base of said third electrode.

3. An electric furnace as recited in claim 1, wherein said inclined electrode extends toward a middle layer of said furnace.

4. An electric furnace as recited in claim 1, wherein the angle of inclination of said inclined electrode is in the range of 5 to 20 degrees.

5. An electric furnace as recited in claim 4, wherein said angle of inclination of said inclined electrode is in the range of 9 to 18 degrees.

6. An electric furnace as recited in claim 1, wherein said first and second electrodes are mounted on opposite sides of said chamber.

7. An electric furnace for resistive heating of molten glass by the Joule effect comprising: a chamber for containing a body of said glass; first and second groups of electrodes, each of said electrodes in said groups having a first end which is the base thereof and a second end which is opposite said first end, said electrodes of said groups being positioned within said chamber such that the distance between the bases of any two electrodes of a respective group is small in comparison to the distance between the bases of an electrode from said first group and an electrode from said second group and said electrodes of said first and second groups being inclined such that said electrodes of said first group are inclined towards said electrodes of said second group and said electrodes of said second group are inclined towards said electrodes of said first group; and means for applying electrical power to said glass through said electrodes such that a current path will be defined between said first and second groups of electrodes.

8. An electric furnace as recited in claim 7, wherein the angle of inclination of said electrodes is in the range of 5 to 20 degrees.

9. An electric furnace as recited in claim 8, wherein said angle of inclination of said electrodes is in the range of 9 to 18 degrees.

* * * * *